(12) United States Patent
Radel et al.

(10) Patent No.: US 11,747,511 B2
(45) Date of Patent: Sep. 5, 2023

(54) NEUTRON ACTIVATION AND DETECTION OF HAZARDOUS, UNDESIRABLE, OR HIGH VALUE MATERIAL

(71) Applicant: SHINE Technologies, LLC, Janesville, WI (US)

(72) Inventors: Ross Radel, Madison, WI (US); Brad Bloomquist, Madison, WI (US); Evan Sengbusch, Madison, WI (US); Rob O'Connell, Madison, WI (US); Eli Moll, Madison, WI (US); Daniel Cech, Madison, WI (US); Gabriel Becerra, Madison, WI (US)

(73) Assignee: SHINE TECHNOLOGIES, LLC, Janesville, WI (US)

( * ) Notice: Subject to any disclaimer, the term of this patent is extended or adjusted under 35 U.S.C. 154(b) by 0 days.

(21) Appl. No.: 17/546,423

(22) Filed: Dec. 9, 2021

(65) Prior Publication Data

US 2022/0091297 A1    Mar. 24, 2022

Related U.S. Application Data

(63) Continuation of application No. 16/796,000, filed on Feb. 20, 2020, now Pat. No. 11,226,428.
(Continued)

(51) Int. Cl.
*G01V 5/00* (2006.01)

(52) U.S. Cl.
CPC .................................. *G01V 5/0069* (2016.11)

(58) Field of Classification Search
CPC ................................................... G01V 5/0069
See application file for complete search history.

(56) References Cited

U.S. PATENT DOCUMENTS

| 5,098,640 A | 3/1992 | Gozani et al. |
| 5,732,115 A | 3/1998 | Atwell et al. |

(Continued)

FOREIGN PATENT DOCUMENTS

WO    WO-2022074573 A1 *  4/2022  ........... G01N 23/222

OTHER PUBLICATIONS

International Search Report & Written Opinion, Int'l Patent Application No. PCT/US2020/018982, dated Aug. 27, 2020, 14 pages.

*Primary Examiner* — David P Porta
*Assistant Examiner* — Fani Polyzos Boosalis
(74) *Attorney, Agent, or Firm* — Casimir Jones, SC; Brian F. Bradley

(57) ABSTRACT

Provided herein are neutron-based detection systems and methods that provide, for example, high throughput analysis of elemental analysis of scrap materials. Such systems and methods find use for the commercial-scale evaluation of bulk process materials where hazardous or otherwise undesirable materials or high value materials may be interspersed with the primary process material. In certain embodiments, the system is used to detect and potentially remove unexploded ordinance (UXO) from a conveyor of demilitarized shell casings being recycled by detecting the presence of nitrogen and other elements present in the UXO. In other embodiments, the system detects and removes unwanted or highly valuable materials from a stream of scrap material.

20 Claims, 6 Drawing Sheets

(6 of 6 Drawing Sheet(s) Filed in Color)

Related U.S. Application Data

(60) Provisional application No. 62/808,330, filed on Feb. 21, 2019.

(56) References Cited

U.S. PATENT DOCUMENTS

| | | |
|---|---|---|
| 7,313,221 B2 | 12/2007 | Sowerby et al. |
| 7,622,709 B2 | 11/2009 | Zillmer et al. |
| 7,622,726 B2 | 11/2009 | Zillmer et al. |
| 9,123,519 B2 | 9/2015 | Bendahan et al. |
| 9,170,218 B2 | 10/2015 | Naqvi et al. |
| 9,329,285 B2 | 5/2016 | Gozani et al. |
| 2002/0175288 A1 | 11/2002 | Taleyarkhan |
| 2010/0038550 A1 | 2/2010 | Devito |
| 2013/0279638 A1 | 10/2013 | Matsumoto et al. |
| 2015/0168319 A1 | 6/2015 | Naqvi |
| 2017/0023500 A1 | 1/2017 | Charette et al. |

\* cited by examiner

NEUTRON ACTIVATION AND DETECTION OF HAZARDOUS, UNDESIRABLE, OR HIGH VALUE MATERIAL

The present application is a continuation of U.S. patent application Ser. No. 16/796,000, filed Feb. 20, 2020, which claims priority to U.S. Provisional Application No. 62/808,330, filed Feb. 21, 2019, which are herein incorporated by reference in their entireties.

FIELD

Provided herein are neutron-based detection systems and methods that provide, for example, high throughput elemental analysis of scrap materials. Such systems and methods find use for the commercial-scale evaluation of bulk process materials where hazardous or otherwise undesirable materials or high value materials may be interspersed with the primary process material. In certain embodiments, the system is used to detect and potentially remove unexploded ordinance (UXO) from a conveyor of demilitarized shell casings being recycled by detecting the presence of nitrogen and other elements present in the UXO. In other embodiments, the system detects and/or removes unwanted or highly valuable materials from a stream of bulk material.

BACKGROUND

The high-level problem is one of improving the efficiency and effectiveness of identifying and removing hazardous, impure, or highly valuable materials from a process stream of material. An example of this is the ammunition demilitarization processes for US and other militaries. The process for demilitarizing small caliber ammunition involves placing rounds in a rotary kiln (or other heating device) and allowing the round to 'cook-off' or self-initiate. The 'cooked-off' rounds are then stored for cool down. In alternative processes the round is mechanically separated (pulled apart, cut apart, etc.), and the energetic fill is manually removed. The final destination for the components of the round are typically metals recyclers, disposal facilities or re-purposing energetic materials into lower grade energetic devices. Prior to the material being released to recyclers or disposal facilities, a quality control step is performed to ensure the materials do not pose a significant hazard (e.g., there is no energetic hazard). The current solution is to perform visual inspection by human operators. The current process for this quality control inspection is labor intensive and subjective, potentially resulting in accidents. Improved systems and methods are needed.

SUMMARY

Provided herein are neutron-based detection systems and methods that provide, for example, high throughput elemental analysis of scrap materials.

For example, in some embodiments, provided herein are compact active neutron interrogation systems comprising one or more of each of: a) a neutron source assembly configured to produce source neutrons; b) a moderator/shielding assembly surrounding the neutron source; c) a gamma or neutron detector assembly that detects secondary radiation induced by the neutrons; d) a material handling component that presents bulk or scrap material to a neutron field generated by the neutron source assembly and to the gamma or neutron detectors; and e) a computer processor configured to identify material of interest from data collected by said detector assembly and to distinguish material of interest from material not of interest. In some embodiments, the system further comprises an alarm component that signals an operator or automated system to remove material of interest from the bulk or scrap material.

In some embodiments, the neutron source utilizes a deuterium-deuterium (DD) fusion reaction to generate said source neutrons. In some embodiments, the neutron source utilizes a deuterium-tritium (DT) fusion reaction to generate said source neutrons. In some embodiments, the neutron source utilizes a radioactive isotope to generate source neutrons. In some embodiments, the neutron source utilizes a proton-beryllium reaction to generate said source neutrons. In some embodiments, the neutron source utilizes a proton-lithium reaction to generate said source neutrons.

In some embodiments, the processor is configured to identify two or more different materials simultaneously (e.g., two different rare earth metals). In some embodiments, processor is configured to identify a trace material contained in bulk material. In some embodiments, the trace material is a trace mineral. In some embodiments, the trace mineral is a rare earth element.

In some embodiments, the system further comprises a bulk material (e.g., a recycling process stream) on the material handling component.

Also provided herein is a compact active neutron interrogation system optimized for the detection of energetic material comprising one or more or each of: a) a neutron source assembly configured to produce source neutrons; b) a moderator/shielding assembly surrounding the neutron source; c) a gamma or neutron detector assembly that detects secondary radiation induced by the neutrons; d) a material handling component that presents bulk or scrap material to the neutron field and to the gamma or neutron detectors; e) a processor configured to identify energetic compounds; and f) an alarm that alerts an operator or automated system to remove the detected energetic material.

In some embodiments, the central neutron source utilizes a deuterium-deuterium (DD) fusion reaction to generate said source neutrons. In some embodiments, the central neutron source utilizes a deuterium-tritium (DT) fusion reaction to generate said source neutrons. In some embodiments, the central neutron source utilizes a radioactive isotope to generate said source neutrons.

In some embodiments, the neutron source utilizes a proton-beryllium reaction to generate said source neutrons. In some embodiments, the neutron source utilizes a proton-lithium reaction to generate said source neutrons. In some embodiments, the moderator and structural material is comprised solely of materials not containing hydrogen, allowing for easier detection of hydrogen in the material being scanned.

In some embodiments, the system further comprises a material location feature utilizing either multiple detectors and a triangulation strategy or one or more gamma cameras.

In some embodiments, the system further comprising a mobile platform on which the neutron source assembly and/or other components of the system is mounted.

Further provided herein are methods of using such systems, for example, to analyze a bulk stream of materials to identify and/or isolate one or more materials of interest away from materials not of interest.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
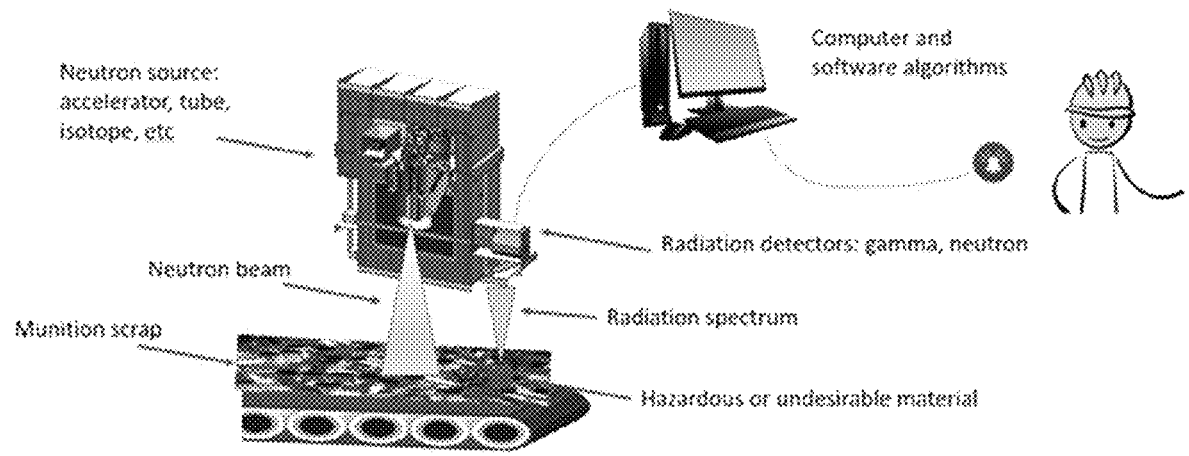
FIG. 1 shows an exemplary schematic of a compact active neutron interrogation system with a central neutron source, moderator assembly, components for presenting bulk material to the neutrons, gamma detector assembly, software algorithm, and components for alerting an operator to remove the material of interest.

Provided herein are systems and methods that improve the efficiency and effectiveness of identifying and removing hazardous, impure, or highly valuable materials from a process stream of material. In some embodiments, the systems and methods employ a neutron source to irradiate scrap materials, radiation detectors to identify what radiation is emitted from the irradiated scrap, and software algorithms to review the radiation spectrum and identify the presence of hazardous materials based on their radiation signature. This method finds use for any number of applications where an impurity is to be detected in a stream of base material.

In some embodiments, the systems and methods provided herein utilize a prompt gamma neutron activation analysis (PGNAA) (REF. 1) measurement technique to provide a non-destructive analysis of the composition of bulk or scrap materials, although many active neutron interrogation techniques may be employed, such as Thermal Neutron Analysis (REF. 2), Fast Neutron Analysis (REF. 3), or Associated Particle Inspection (REF. 4), based on the elemental composition of the bulk and hazardous material. In the PGNAA method, neutrons interact with elements in the materials, which then emit secondary, prompt gamma rays that are measured. Each element emits a unique "fingerprint" of secondary gamma radiation that is used to quantify the composition of the material being measured.

In some embodiments, a neutron source is used to irradiate scrap materials, radiation detectors are used to identify what radiation is emitted from the irradiated scrap, software algorithms are used to review the radiation spectrum and identify the presence of hazardous materials based on their radiation signature, and components for separating the hazardous material from the primary stream of material are used. An example embodiment is the activation and detection of nitrogen, which is commonly present in gun powders and other energetic materials, based on the emission of a 10.8 MeV gamma ray. Another example embodiment is the activation and detection of hydrogen, which is present in energetic materials and in certain corrosion products, based on the emission of a 2.2 MeV gamma ray. Such example embodiments are of relevance to the demilitarization of ammunition and artillery rounds.

In another embodiment, a neutron source is used to irradiate electronics waste streams and improve the efficiency of the process and quality of the extracted materials. Efficient separation of materials is the foundation of electronics recycling. In the e-waste recycling it is critical to ensure lead, mercury, cadmium and other heavy metals are kept out of landfills and water sources. Additionally, valuable precious metals such as gold, silver and platinum are present in the electronic devices. Initial shredding of e-waste stream facilitates sorting and separation of plastics from metals and internal circuitry. Powerful magnets separate iron and steel from the waste stream on a conveyor. Further mechanical processing separates aluminum, copper and circuit boards from the material stream which now is mostly plastic. Water separation technologies are used to separate glass from plastics. The final step in the separation process locates and extracts any remaining metal remnants from the plastics to further purify the stream. In the e-waste process, visual inspection and hand sorting are used to improve the quality of extracted materials. As previously described, the activation and detection of hydrogen, which is present in plastic, based on the emission of a 2.2 MeV gamma ray, can allow the separation of plastics from the metals' streams. In the reverse, ferrous metals can be detected and separated from plastics streams by the activation of iron and emission of 7.6 MeV gamma rays. The silicon present in the glass can be activated and detected by the presence of a 4.9 or 10.4 MeV gamma ray to allow the separation of glass from plastics. These detection methods can improve the efficiency and effectiveness versus visual inspection and hand sorting. Further, an example embodiment can detect hazardous materials in waste streams. For example, lead can be detected by the presence of 7368 and 3936 keV gamma rays [REF 5]. Cadmium can similarly be detected by the presence of a 9043 keV gamma peak, amongst others [REF 5]. These and any number of additional materials may be scanned for simultaneously, each of which has its own unique gamma signature. Scanning for and removing these elements prior to waste entering a landfill provides a further level of environmental protection.

Provided herein are descriptions of industrial scale analysis systems that provide a neutron source and moderator assembly coupled to a material handling system to move bulk material through the resultant thermal neutron "cloud", detector systems to capture resulting radiation, algorithms to process the data, and an isolation system to allow removal of unwanted material from the primary stream. An exemplary configuration is shown in FIG. 1.

In some embodiments, the interrogation process is driven by, for example, any non-reactor source of high energy neutrons. Embodiments of the technology may be employed with a high-energy ion beam generator system such as those described in, U.S. Pat. Publ. No. 2011/0096887, 2012/0300890, and 2016/0163495 and U.S. Pat. Nos. 8,837,662 and 9,024,261, all of which are herein incorporated by reference in their entireties. In other cases, a radionuclide-based neutron source, such as Cf-252 or PuBe, is used. However, it should be understood that these inspection techniques may be applied to a wide range of high energy neutron generating technologies such as deuterium-deuterium or deuterium-tritium tubes, radiofrequency quadrupole linear accelerators (LINAC), and cyclotron or LINAC proton beams coupled with Beryllium or Lithium targets.

Neutrons interacting with the process material cause nuclear reactions to occur, resulting in secondary gamma and/or neutrons to be generated. Each element emits a unique "fingerprint" of secondary gamma (and sometimes neutron) radiation that finds use to quantify the composition of the material being measured including but not limited to those listed in the table below.

brightness, of the neutron source should be high enough to allow penetration of the primary stream of material and provide adequate activation of undesirable material in order to provide a detectable signal to radiation detectors. A source with a neutron output greater than 1e10 neutrons/second may be necessary in some applications to provide reasonable process throughput. In some embodiments, the hazardous or otherwise interesting gamma peaks are quantified by utilizing standards of know geometry and composition. In certain embodiments, multiple detectors are used to triangulate the location of the material of interest by comparing signal intensity. In other embodiments, detector arrays (potentially collimated) are used to generate more specific location information. Example detector types that could be incorporated into application include but are not limited to inorganic crystal scintillators such as sodium iodide, lanthanum bromide, lanthanum chloride, cesium iodide, cesium fluoride, potassium iodide, lithium iodide, barium fluoride, calcium fluoride, bismuth germanate, germanium lithium, zinc sulfide, calcium tungstate, cadmium tungstate, yttrium aluminium garnet, gadolinium oxyorthosilicate, lutetium iodide, and lutetium oxyorthosilicate or plastic scintillators like polyethylene naphthalate, Each of these detectors has specific properties like detection efficiency, light output and

| Material | Key Elemental Features & relative density | Usable Nuclear Reactions | Available Signatures |
|---|---|---|---|
| CONTRABAND Explosives | relatively high O<br>relatively high N<br>relatively low C<br>relatively low H | (n,n'γ) (also n,n)<br>($n_{th}$,γ)/(n,n'γ)<br>(also n,n)<br>(n,n'γ) (also n,n)<br>($n_{th}$,γ) | 6.130 MeV<br>10.80/5.11, 2.31, 1.64 MeV<br>4.43 MeV<br>2.223 MeV |
| Drugs (Cocaine/Heroin) | relatively high C<br>relatively high H<br>relatively low O<br>low-medium Cl (for HCl-drugs) | (n,n'γ) (also n,n)<br>($n_{th}$,γ)<br>(n,n'γ) (also n,n)<br>($n_{th}$,γ) and (n,n'γ) | as above<br>as above<br>as above<br>6.110 MeV and other strong lines for Cl |
| MINERALS Cement | Ca, Si, Fe, Al, Mg | ($n_{th}$,γ) | specific capture (-rays, e.g.,<br>6.420 MeV for Ca<br>4.934 MeV for Si<br>7.630-46 MeV for Fe, etc. |
| Coal | C (high concentration)<br>H, S, Si, Al, Fe, Ca, K, Na, Ti | ($n_{th}$,γ), (n,n'γ)<br>($n_{th}$,γ) | specific capture (or inelastic) γ-rays,<br>e.g., 4.945 MeV (n,( ) and 4.43 MeV (n,nN( ) for C, 2.223 MeV for H, 5.420 MeV for S, etc. |
| NUCLEAR | $^{232}$Th, $^{233}$U, $^{235}$U, $^{239}$Pu, $^{240}$Pu | ($n_{th}$,f), ($n_f$,f), (γ,f);<br>$2^{nd}$: ($n_{th}$,γ) (n,n'γ) | $n_p$, $n_d$(t), $γ_p$, $γ_d$(t); also high multiplicity coincidence;<br>very high Z & density |

In some embodiments, the fast neutron source is wholly or partially surrounded by multiplying and/or moderating material and/or neutron collimators, such that the neutron flux, energy spectra and beam shape are tailored to optimize the reaction rate of the material(s) to be detected while simultaneously minimizing background radiation production and ensuring safe operations. In certain embodiments, this utilizes several inches or feet thicknesses of moderating material to maximally thermalize the neutron population including but not limited to graphite, light water, heavy water, beryllium, or polyethylene. In other embodiments, the moderator, shielding, and structural materials (including the material handling equipment) are constructed of materials that do not contain any hydrogen. This ensures a very low background level of 2.2 MeV hydrogen-induced gamma rays such that hydrogenous material (e.g. residual energetic material in ammunition) is more easily detected.

Detectors are utilized to measure this secondary radiation, including the spectrum of gamma energy. The strength, or energy resolution in addition to costs that present benefits and drawbacks for distinguishing between many radiation signatures. This also more easily allows for multiple hazardous or non-desirable components to be detected and tracked simultaneously.

Figure 2:
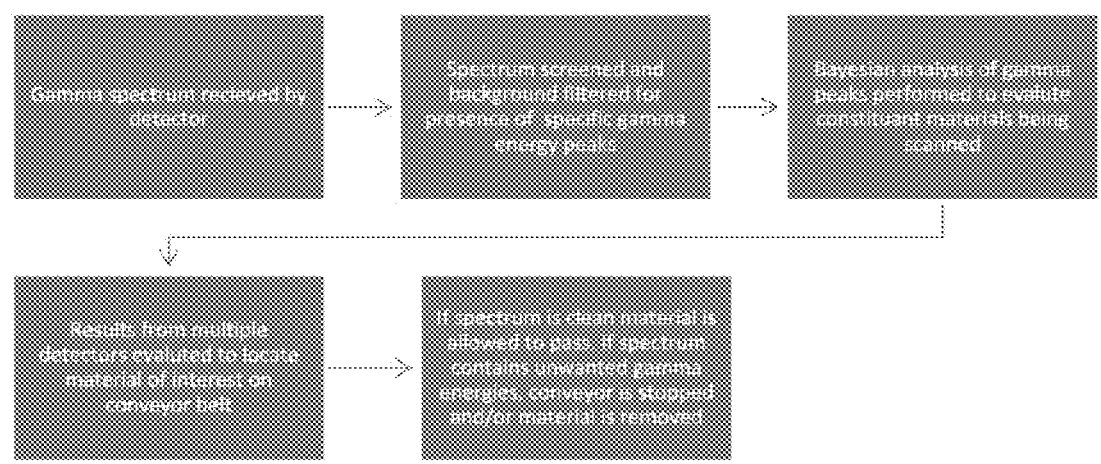
FIG. 2 shows an exemplary computer analysis process for analyzing data generated from the systems and methods described herein.
Figure 3:
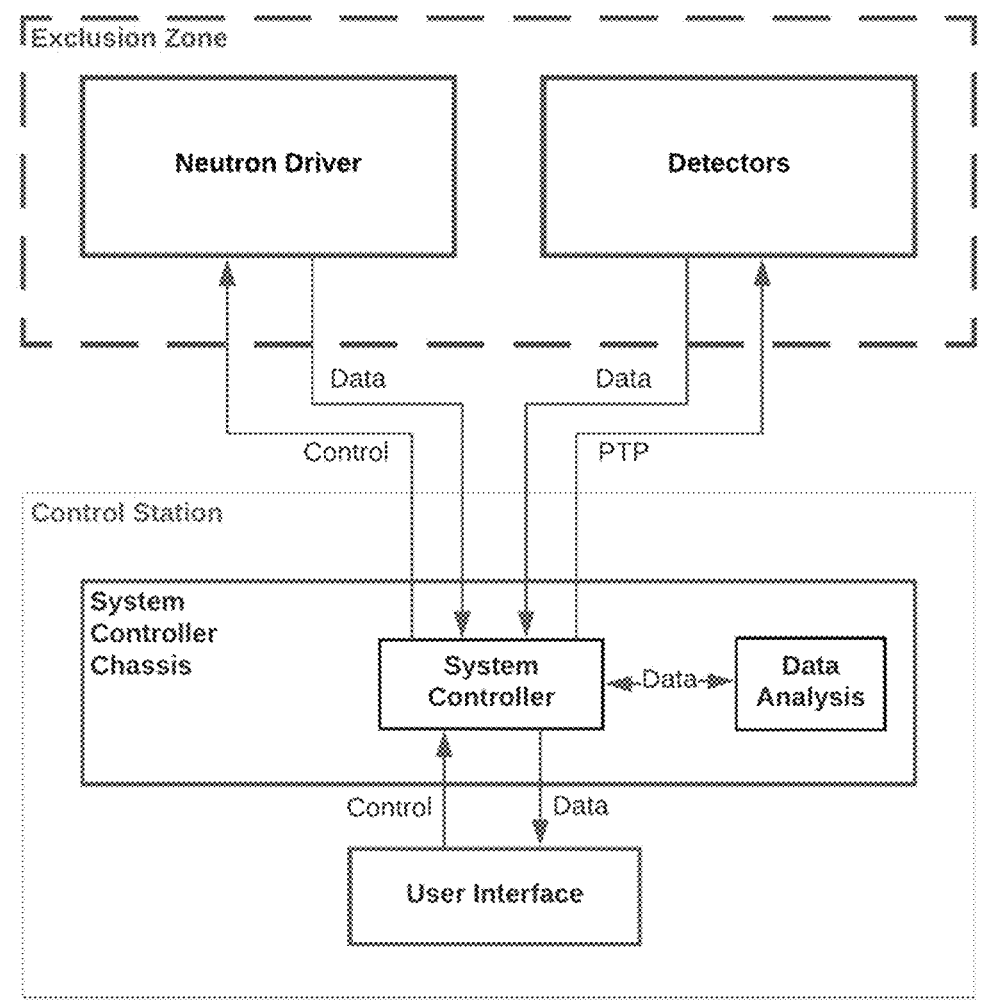
FIG. 3 shows a top-level block diagram of a neutron activation and detection system.

In some embodiments, the radiation spectrum data is post-processed by a computer and software algorithms identify the presence of hazardous or non-desirable elements or high value materials based on the known radiation signatures of isotopes of those elements (See FIG. 2 and FIG. 3). One option for a post-processing technique is to employ a Bayesian statistical analysis to estimate parameters material quantities based on the observed gamma peak distributions.

Figure 4:
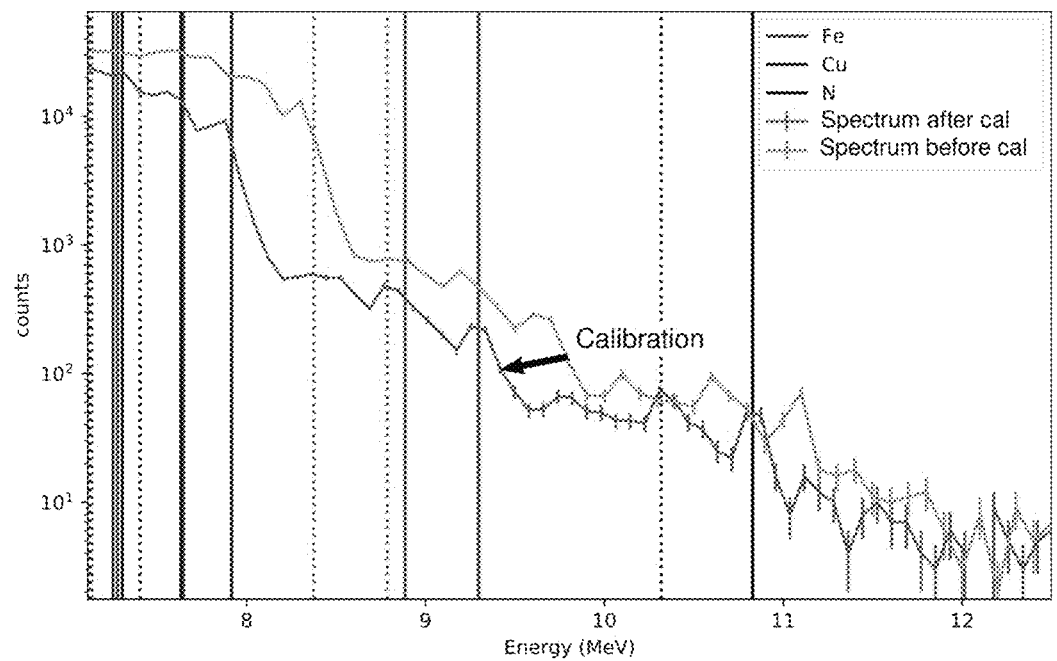
FIG. 4 shows an exemplary gamma spectrum before (orange) and after (blue) calibration. Dashed lines indicate the first escape of the element of same color.
Figure 5:
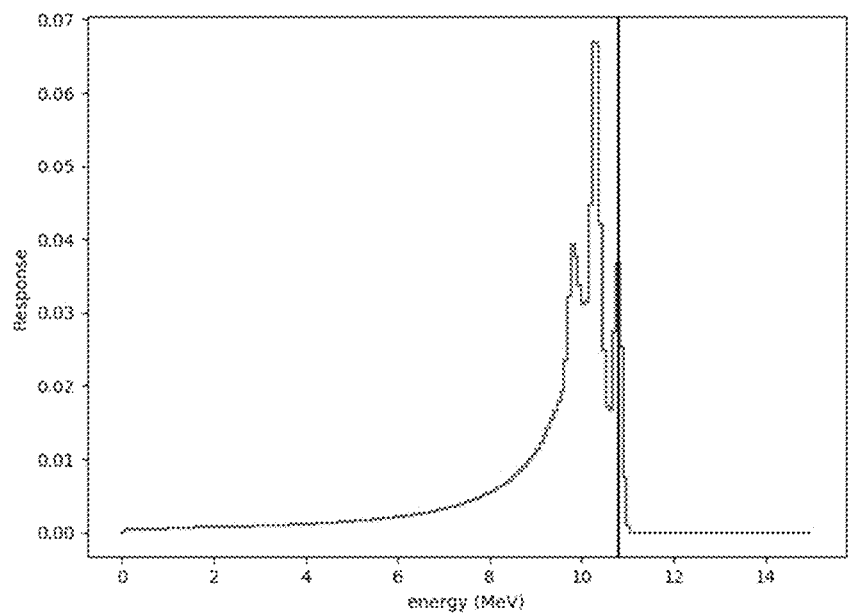
FIG. 5 shows and exemplary response function of 3"×3" LaBr3 crystal with Photo Multiplier Tube (PMT) for 10.8 MeV incident gamma flux.

When employing this technique, a gamma energy calibration would first be performed. This is accomplished by utilizing a list of times, amplitudes and chi-squared values for calibration data. This is binned into a crude spectrum with a fixed scale factor converting the pulses into units of MeV. As shown in FIG. 4, the user then matches the energy peaks of specific elements, for example, iron (Fe), hydrogen (H) and copper (Cu) to calibrate the spectrum. Once the calibration has been established, the data is analyzed to measure the gamma peaks of interest, Silicon (Si) and Nitrogen (N) in the example shown in FIG. 4. The scintillator materials used to detect high-energy gammas have the interesting property that the maximum response may not be at the input energy. This is due to the increasing probability of electron-positron pair production. The positron will collide and annihilate within ~1 ns, releasing two 511 keV photons. The first and second escape peaks (as seen in FIG. 5) occur when one or both of those photons are lost. In fact, for a 3"×3" $LaBr_3$ crystal, the first escape peak is larger than the full-energy photopeak in the energy range of interest.

Figure 6:
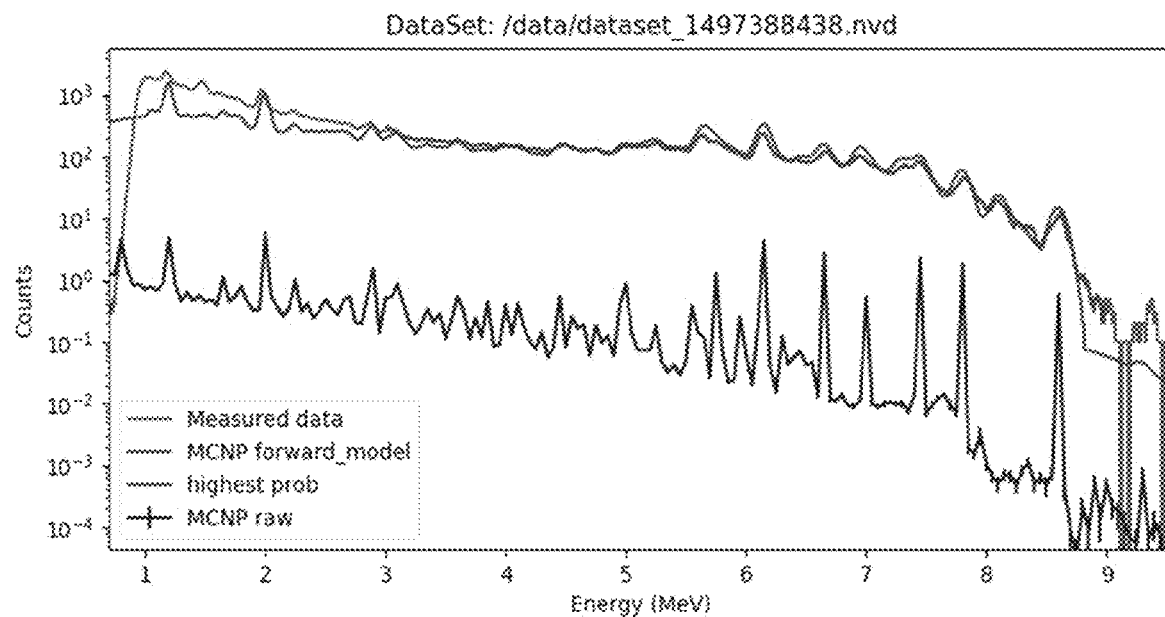
FIG. 6 shows an exemplary application of the forward model to match chlorine lines in PVC. The raw predictive (MCNP code) calculation output is shown in blue (scaled to a smaller value for clarity). The response function (which changes with energy) is convolved with the MCNP calculation to predict what will be measured, shown in green. The measured data is highlighted in red.

The detector response varies with incident energy and detector size. An analysis code, such as the Monte Carlo Neutral Particle (MCNP) code, returns the response function as a function of energy. The response function may be used as a forward model. An example using calibration with chlorine and low intensity Cf-232 source (~2.5×10$^5$ n/s) is shown in FIG. 6.

In the Bayesian analysis strategy, a forward model (F) for the NaI and $LaBr_3$ detectors is utilized. Given a concentration of Si or N (for example), a prediction of gamma counts ($D_k$) in given energy bins ($E_k$) can be computed where k is used as the index of the energy bin.

$$D_k = Si * [F_{LaBr3}(E_{Si})]_k + N * [F_{LaBr3}(E_N)]_k$$

The photon distribution in a given energy bin is binomial, so the probability of a given photon count (measurement "M" counts) in a given bin can be computed as a function of concentration of silicon (Si) and nitrogen (N).

$$Prob(M_k \vee Si, N) = \frac{D_k^{M_k} e^{-D_k}}{M_k!}$$

Bayes' theorem is applied at this point to compute the probability of Si, N concentration given the M photon measurements in each k bin:

$$Prob(Si, N \vee M_k) \propto \prod_{k_{10MeV}}^{k_{11.1MeV}} Prob(M_k \vee Si, N) \times Prob(Si, N \mid I$$

Figure 7:
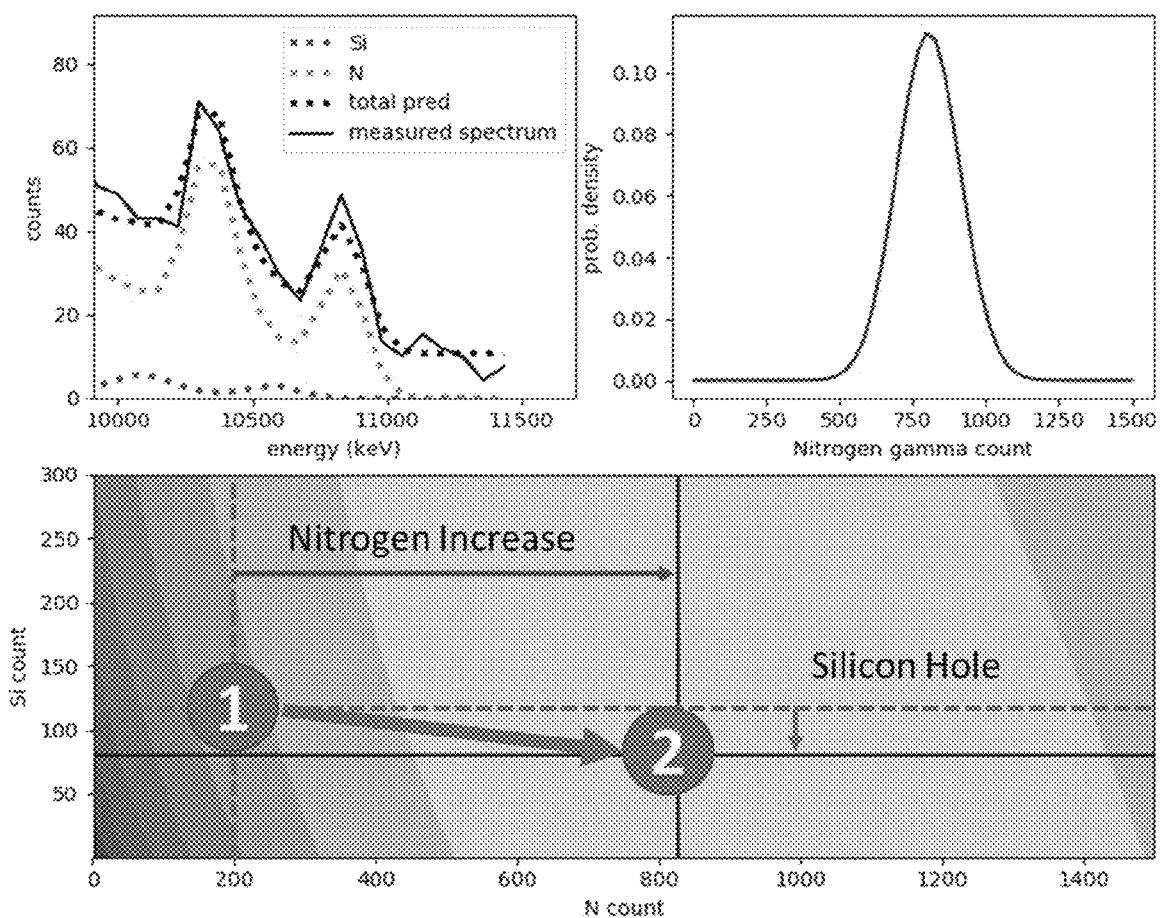
FIG. 7 shows an exemplary Bayesian analysis of measured gamma spectrum, with gamma counts of the 10.8 MeV nitrogen line and the 10.6 MeV silicon line. Dot 1 corresponds to the reference background case, and Dot 2 corresponds to IED simulant case. The top left shows the measured spectrum, and the best fit along with the constituent Si and N parts. The top right shows the final count probability distribution for the nitrogen. The bottom panel shows the 2D probability map for both Si and N.

The last term is the prior probability. At the very start this could be based on data available from other measurements or even a uniform initial guess. One implementation calculates the logarithm above as it is more stable, at the end the inverse is performed. As more data is collected, the probability evolves. Once all the data has been evaluated, a probability for Si and N respective gamma count is given. A summary of the result of the Bayesian analysis is shown in FIG. 7. The energetic material in this example displaces sand, this causes a drop in the silicon signal (a "silicon hole"), and an increase in the nitrogen signal.

Figure 8:
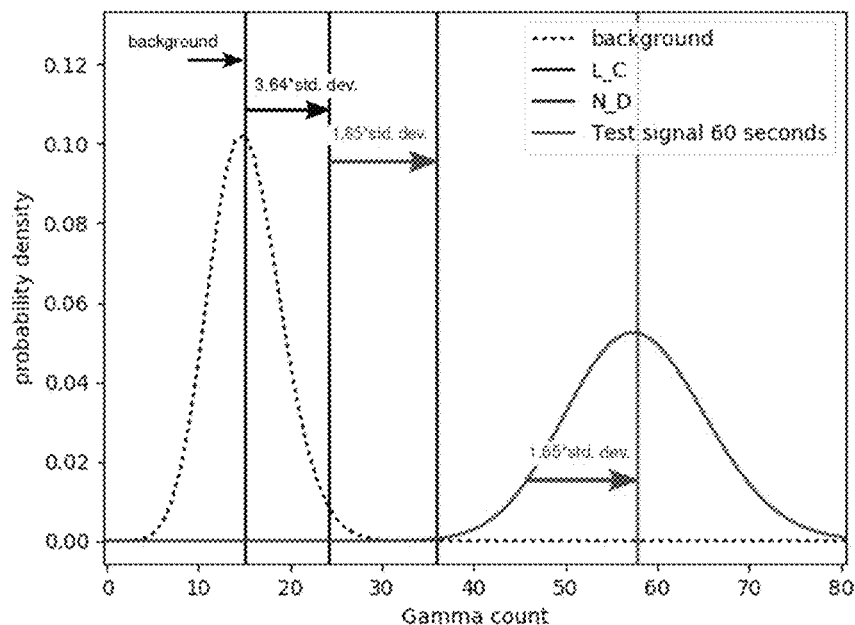
FIG. 8 shows a description of the Currie detection threshold which is based off the reference background signal, its standard deviation, and the standard deviation of the test signal.
Figure 9:
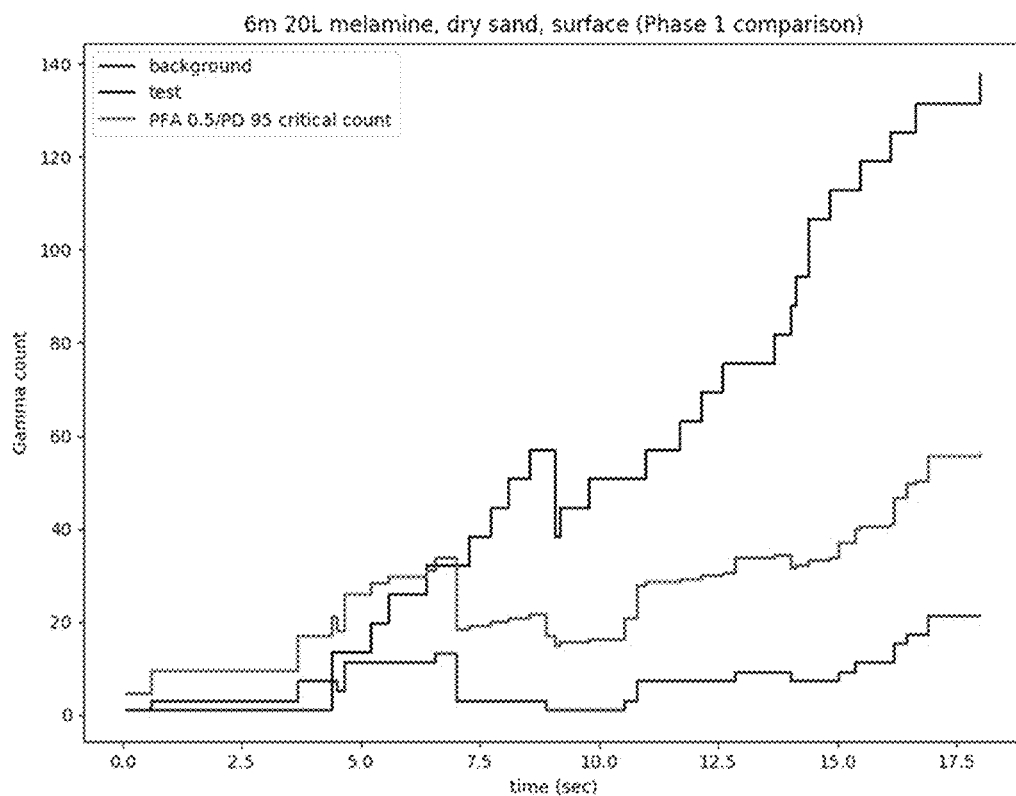
FIG. 9 shows an exemplary plot of detected counts versus time for energetic material being scanned.

Both background and test signals have variations due to signal noise. For a given measured photon count the primary error is the Poisson noise in the photon count. Other sources of noise, for example drift in the spectral calibration, background counts due to external sources (e.g. activation of objects in the vicinity of the detectors) and pulse pile-up, are harder to quantify. The criterion used to distinguish high nitrogen content from background was the Currie detectability threshold. This accounts for variation in the reference background measurement, and also variation in the test signal measurement. The Currie detectability threshold is widely used in the chemical and nuclear industries and was developed by L. A. Currie at the National Bureau of Standards in 1968 [REF. 6]. The procedure is illustrated in FIG. 8. The reference background, its standard deviation, and the standard deviation of the test signal contributes to the detection threshold. As a function of time the reference count, the test signal, and the detection threshold evolve over time. When the test signal is higher than the detection threshold, then a material with high nitrogen content has been detected. A graph of example signal counts over time is shown in FIG. 9.

Figure 10:
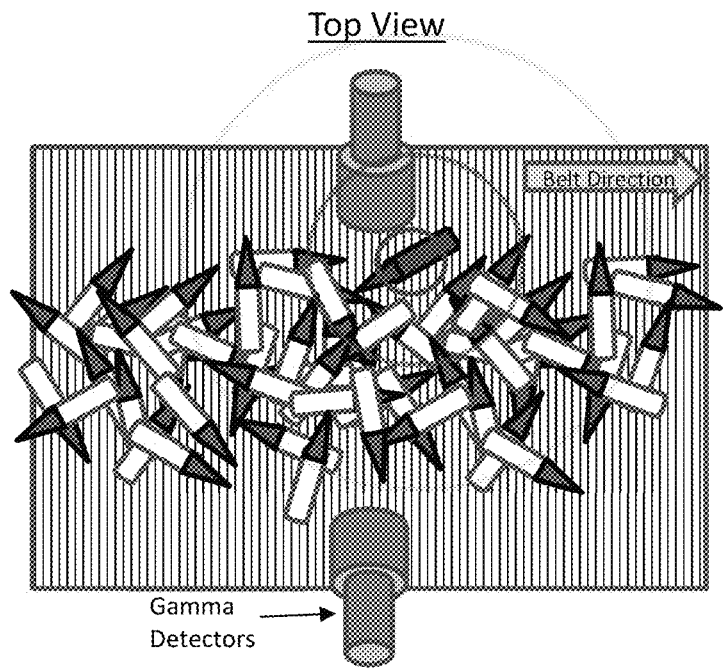
FIG. 10 shows the top and side views of an exemplary system for detecting the location of hazardous material on a conveyor system.
Figure 10:
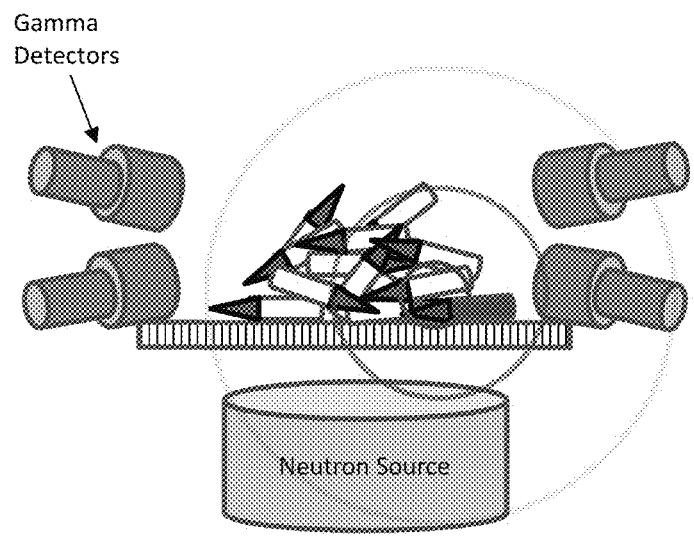

In some embodiments, a series of gamma detectors can be utilized simultaneously to identify the location of a material being detected. When the material of interest is irradiated with neutrons and emits gamma radiation, the intensity of that radiation decreases as distance from the material squared. This concept is depicted in FIG. 10. By comparing the relative intensity of the gamma signatures via the processing algorithm, the location of the material relative to the detectors can be computed in real time. This information can then be provided to the operators or a secondary sorting system to isolate the material. Another embodiment of this concept would utilize a "gamma camera" such as those currently employed in the medical and certain industrial fields. The gamma camera would be configured to seek the "image" of the emittance of individual gamma energy peaks. These gamma cameras are most effective when capturing images of low energy gamma rays, and so may not be applicable when detecting certain elements that emit higher energy gammas.

Once a hazardous item is identified, the system notifies an operator to remove the item from the process stream. In other embodiments, the software interfaces to a mechanical sorting mechanism that automatically removes the identified material to a separate area away from the main process stream. This separation is accomplished via any number of mechanical mechanisms. A secondary scan of the material or passage of the material over a secondary set of radiation detectors can also be performed to ensure hazardous item has been removed from the processing stream.

CITATIONS

1) PGNAA
   Published: Sep. 1, 1998
   Richard M. Lindstrom
   Proceedings of the Korea Atomic Energy Research Institute Cold Neutron Workshop
   https://www.nist.gov/publications/prompt-gamma-neutron-activation-analysis?pub_id=903948
   https://www.ncnr.nist.gov/instruments/pgaa/
2) TNA
   Thermal neutron analysis (TNA) explosive detection based on electronic neutron generators, W. C. Lee D. B. Mahood P. Ryge P. Shea T. Gozani,
   Nuclear Instruments and Methods in Physics Research Section B: Beam Interactions with Materials and Atoms Volume 99, Issues 1-4, 5 May 1995, Pages 739-742
   https://www.sciencedirect.com/science/article/pii/0168583X95002219

3) FNAA
Source: Element Analysis Corporation
https://www.chemicalonline.com/doc/fast-neutron-activation-analysis-fnaa-0001

4) API
Design of an associated particle imaging system
Albert Beyerle J. Paul Hurley Laura Tunnell
Nuclear Instruments and Methods in Physics Research Section A: Accelerators, Spectrometers, Detectors and Associated Equipment
Volume 299, Issues 1-3, 20 Dec. 1990, Pages 458-462
https://www.sciencedirect.com/science/article/pii/016890029090825Q?via%3Dihub 5) *Database of Prompt Gamma Rays from Slow Neutron Capture for Elemental Analysis*. International Atomic Energy Agency. Vienna, 2007

6) *Limits for Qualitative Detection and Quantitative Determination*. Lloyd A. Currie. Analytical Chemistry, Vol. 40, No. 3, March 1968

We claim:

1. A compact active neutron interrogation system comprising:
   a) a neutron source assembly configured to produce source neutrons;
   b) a moderator/shielding assembly surrounding the neutron source;
   c) a gamma or neutron detector assembly that detects secondary radiation induced by the neutrons;
   d) a material handling component that presents bulk or scrap material to a neutron field generated by the neutron source assembly and to the gamma or neutron detectors; and
   e) a computer processor configured to identify material of interest from data collected by said detector assembly and to distinguish material of interest from material not of interest;
   wherein the bulk or scrap material comprises a recycling process stream, and wherein the material of interest is lead, mercury, or cadmium.

2. The system of claim 1, further comprising an alarm component that signals an operator or automated system to remove material of interest from the bulk or scrap material.

3. The system of claim 1, where the neutron source utilizes a deuterium-deuterium (DD) fusion reaction to generate said source neutrons.

4. The system of claim 1, where the neutron source utilizes a deuterium-tritium (DT) fusion reaction to generate said source neutrons.

5. The system of claim 1, where the neutron source utilizes a radioactive isotope to generate source neutrons.

6. The system of claim 1, where the neutron source utilizes a proton-beryllium reaction to generate said source neutrons.

7. The system of claim 1, where the neutron source utilizes a proton-lithium reaction to generate said source neutrons.

8. The system of claim 1, where the processor is configured to identify two or more different materials of interest simultaneously.

9. The system of claim 1, where the recycling stream is an electronics waste stream.

10. The system of claim 1, where the moderator/shielding assembly is comprised solely of materials not containing hydrogen.

11. A compact active neutron interrogation system comprising:
    a) a neutron source assembly configured to produce source neutrons;
    b) a moderator/shielding assembly surrounding the neutron source;
    c) a gamma or neutron detector assembly that detects secondary radiation induced by the neutrons;
    d) a material handling component that presents bulk or scrap material to a neutron field generated by the neutron source assembly and to the gamma or neutron detectors; and
    e) a computer processor configured to identify material of interest from data collected by said detector assembly and to distinguish material of interest from material not of interest;
    wherein the bulk or scrap material comprises a recycling process stream, and wherein the material of interest is gold, silver, or platinum.

12. The system of claim 11, further comprising an alarm component that signals an operator or automated system to remove material of interest from the bulk or scrap material.

13. The system of claim 11, where the processor is configured to identify two or more different materials of interest simultaneously.

14. The system of claim 11, where the recycling stream is an electronics waste stream.

15. The system of claim 11, where the moderator/shielding assembly is comprised solely of materials not containing hydrogen.

16. A compact active neutron interrogation system comprising:
    a) a neutron source assembly configured to produce source neutrons;
    b) a moderator/shielding assembly surrounding the neutron source;
    c) a gamma or neutron detector assembly that detects secondary radiation induced by the neutrons;
    d) a material handling component that presents bulk or scrap material to a neutron field generated by the neutron source assembly and to the gamma or neutron detectors; and
    e) a computer processor configured to identify material of interest from data collected by said detector assembly and to distinguish material of interest from material not of interest;
    wherein the bulk or scrap material comprises a recycling process stream, and wherein the material of interest is a rare earth element.

17. The system of claim 16, further comprising an alarm component that signals an operator or automated system to remove material of interest from the bulk or scrap material.

18. The system of claim 16, where the processor is configured to identify two or more different materials of interest simultaneously.

19. The system of claim 16, where the recycling stream is an electronics waste stream.

20. The system of claim 16, where the moderator/shielding assembly is comprised solely of materials not containing hydrogen.

* * * * *